US012772027B2

(12) United States Patent
Bishop

(10) Patent No.: US 12,772,027 B2
(45) Date of Patent: Oct. 20, 2026

(54) INTELLIGENT PROVISIONING

(71) Applicant: Boost SubscriberCo L.L.C., Englewood, CO (US)

(72) Inventor: Julian David Bishop, Elizabeth, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 280 days.

(21) Appl. No.: 18/388,370

(22) Filed: Nov. 9, 2023

(65) Prior Publication Data

US 2025/0159446 A1 May 15, 2025

(51) Int. Cl.
*H04W 4/50* (2018.01)
*H04W 8/18* (2009.01)
*H04W 88/06* (2009.01)

(52) U.S. Cl.
CPC ............... *H04W 4/50* (2018.02); *H04W 8/18* (2013.01); *H04W 88/06* (2013.01)

(58) Field of Classification Search
CPC ................................ H04W 8/18; H04W 88/06
USPC .......................................................... 455/418
See application file for complete search history.

(56) References Cited

U.S. PATENT DOCUMENTS

2021/0250430 A1* 8/2021 Moon ................... H04W 8/183
2023/0032596 A1* 2/2023 Mengwasser ........... H04L 41/16

* cited by examiner

*Primary Examiner* — Jirapon Tulop
(74) *Attorney, Agent, or Firm* — Lowenstein Sandler LLP

(57) ABSTRACT

This disclosure relates to intelligent network service provisioning. In some aspects, a method includes receiving, via one or more application programming interfaces (APIs), a request for provisioning wireless network services on a mobile device, the request identifying target attributes associated with the wireless network services. The method includes identifying, using a trained machine-learning model, at least one mobile network operator (MNO) satisfying corresponding target attributes associated with at least a portion of the wireless network services. The method includes generating a subscriber identification module (SIM) profile request corresponding to the at least one MNO, which is transmitted to retrieve a corresponding SIM profile associated with the at least one MNO. The method includes receiving the corresponding SIM profile associated with the at least one MNO. The method includes provisioning one or more SIMs of the mobile device in accordance with the corresponding SIM profile.

20 Claims, 4 Drawing Sheets

INTELLIGENT PROVISIONING

TECHNICAL FIELD

This specification generally relates to intelligent network service provisioning.

BACKGROUND

Network service provisioning refers to the process of setting up and configuring the resources necessary to provide network services to users or customers. This includes the allocation of network resources, as well as the configuration of networking protocols and security settings.

SUMMARY

In one aspect, this document describes a method for intelligent network service provisioning. The method includes receiving, via one or more application programming interfaces (APIs) at one or more computing devices, a request for provisioning wireless network services on a mobile device, the request identifying target attributes associated with the wireless network services. The method also includes identifying, by the one or more computing devices using a trained machine-learning model, at least one mobile network operator (MNO) from a pool of multiple MNOs, the at least one MNO satisfying corresponding target attributes associated with at least a portion of the wireless network services. The method further includes generating, by the one or more computing devices, a subscriber identification module (SIM) profile request corresponding to the at least one MNO, wherein the SIM profile request is transmitted to retrieve a corresponding SIM profile associated with the at least one MNO, and receiving, at the one or more computing devices, the corresponding SIM profile associated with the at least one MNO. The method also includes provisioning, by the one or more computing devices, one or more SIMs of the mobile device in accordance with the corresponding SIM profile such that the portion of the wireless network services is provided on the mobile device by the corresponding MNO.

Other embodiments of this aspect include corresponding computer systems, apparatus, computer program products, and computer programs recorded on one or more computer storage devices, each configured to perform the actions of the method. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations, the one or more SIMs of the mobile device can include two SIMs that function in accordance with dual SIM dual standby (DSDS) technology.

In some implementations, the two SIMs of the mobile device can be provisioned such that a first SIM of the two SIMs has a subscription to a first subset of wireless network services from a first MNO, and a second SIM of the two SIMs has a subscription to a second subset of wireless network services from a second MNO different from the first MNO.

In some implementations, the one or more SIMs of the mobile device can include a universal SIM.

In some implementations, the wireless network services can include (i) data services that are provided on the mobile device by a first MNO, and (ii) voice services that are provided on the mobile device by a second MNO different from the first MNO.

In some implementations, each wireless network service provided by a MNO can be associated with a roaming service from one or more partner MNOs that are in collaboration with the MNO, and the one or more partner MNOs can be each associated with a priority.

In some implementations, the machine-learning model can be trained to predict the at least one MNO and the corresponding portions of wireless network services based on a customer's location, coverage of various network services of the MNOs, the customer's preferences, a type of user device of the customer, predetermined service rules, and market preferences.

Particular implementations of the subject matter described in this disclosure can be implemented so as to realize one or more of the following advantages. By allowing for a particular mobile device to be provisioned to be serviced by multiple network operators, the technologies described in this document can provide for high-quality wireless service that potentially leverages corresponding strengths from the individual network operators. For example, if a first network operator (e.g., a mobile network operator (MNO)) provides the best quality data service in a particular area but a second network operator provides better voice services as compared to the first network operator, the technologies described herein allow for a mobile device to be provisioned to receive the data services and the voice services from the first and second network operators, respectively. In general, by breaking down network services into smaller, more specific components, and allowing for selection of corresponding network operators for the individual components, the technologies described herein can not only facilitate high-quality service for the users, but also allow for precise control and management (and by extension, efficient and effective use) of the corresponding network resources. This approach in turn can help to improve network efficiency, scalability, and quality of service, and enable more flexible service delivery and consumption. By providing granular network services selected from various network services of multiple network operators, the technologies described herein can provide customized network services to satisfy the customer's specific needs and preferences, and provide a personalized and tailored experience, potentially leading to high user satisfaction.

It is appreciated that methods and systems in accordance with the present disclosure can include various combinations of the aspects and features described herein. That is, methods and systems in accordance with the present disclosure are not limited to the specific combinations of aspects and features specifically described herein, but also may include other combinations of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

The technologies described in this document can allow a mobile device to be provisioned to receive a set of network services from multiple mobile network operators (MNOs), e.g., wireless service providers, wireless carriers, and mobile virtual network operators (MVNOs), etc. The set of network services can include granular network services from multiple network operators/providers. For example, voice call service can be provided by network operator A, and data service can be provided by network operator B due to availability of high bandwidth. Through the use of granular network services, selected from multiple network operators, the technologies described herein offer customized network services that cater to the specific needs and preferences of the customer. This results in a more personalized and tailored experience, which leads to improved user experience and increased customer satisfaction.

Furthermore, the technologies described in this document can unlock the value of leveraging different networks of different network operators/providers. The technologies detailed in this document can deliver several benefits, including cost optimization, expanded market reach, streamlined device onboarding, enhanced customer experience, seamless onboarding of customers across multiple networks, support for private 5G, and the ability to incorporate additional network partners. By allowing access to various network services provided by multiple network operators in a granular manner, the technologies described in this document allow for precise control and management of network resources, leading to efficient and effective use of these resources, and ultimately, improved network efficiency, scalability, and quality of service, while saving costs and enabling flexible service delivery and consumption.

Figure 1:
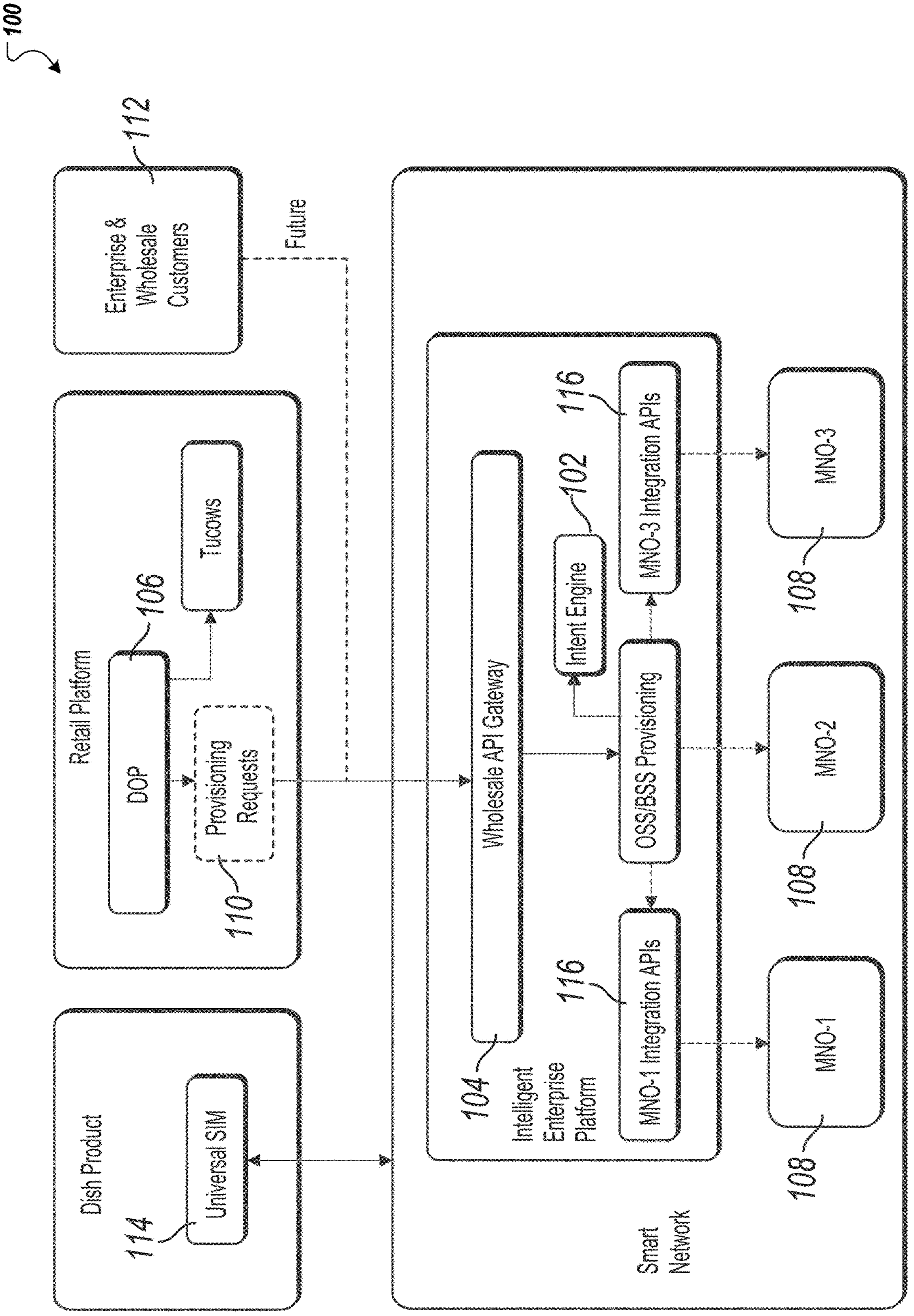
FIG. 1 is an example system for intelligent network service provisioning.

FIG. 1 is a block diagram of an example environment 100 for intelligent network service provisioning in accordance with technology described herein. The example environment 100 includes a computing system including one or more computing devices performing as an intent engine 102, a digital operation platform (DOP) 106 including one or more request devices, and at least one mobile network operator (MNO) system 108.

A request device of the DOP 106 can issue a request, e.g., provisioning request 110, for provisioning wireless network services on a mobile device (not shown). The request can identify target attributes associated with the wireless network services. The computing system can receive the request from the request devices over a network.

The computing system of the intent engine 102 can receive the requests 110 from the request devices of the DOP 106 via one or more application programming interfaces (APIs). In some implementations, the computing system can receive the request from a retail platform. For example, the retail staff (e.g., a customer service representative) of a service provider may sell plans and devices to customers. The retail staff can use a request device of the retail DOP platform 106 to request provisioning of network services on a customer's mobile device. The request 110 can be received from an application program interface (API) available to the retail platform, such as a wholesale API gateway 104.

In some implementations, the request 110 can be received from mobile virtual network operators (MVNOs), or enterprise and wholesale customers 112. The request devices can be devices of the MVNOs or the enterprise and wholesale customers. The request can be received through standard application program interface (API) available to the mobile virtual network operators (MVNOs) or enterprise customers. For example, the computing system can receive the provisioning request 110 from the wholesale API gateway 104.

The request 110 can identify target attributes associated with the wireless network services to be provisioned, such as the type of the network services, the performance level or quality, the bandwidth, the delay, the budget or cost of the wireless network services, and the like.

The computing system of the intent engine 102 can identify, using a trained machine-learning (ML) model, at least one mobile network operator (MNO) from a pool of multiple MNOs. The multiple MNOs can provide various wireless network services. The computing system of the intent engine 102 can examine the available services of the multiple MNOs to select a set of wireless network services from at least one MNO 108 that provides wireless network services satisfying corresponding target attributes associated with at least a portion of the requested wireless network services.

Figure 2:
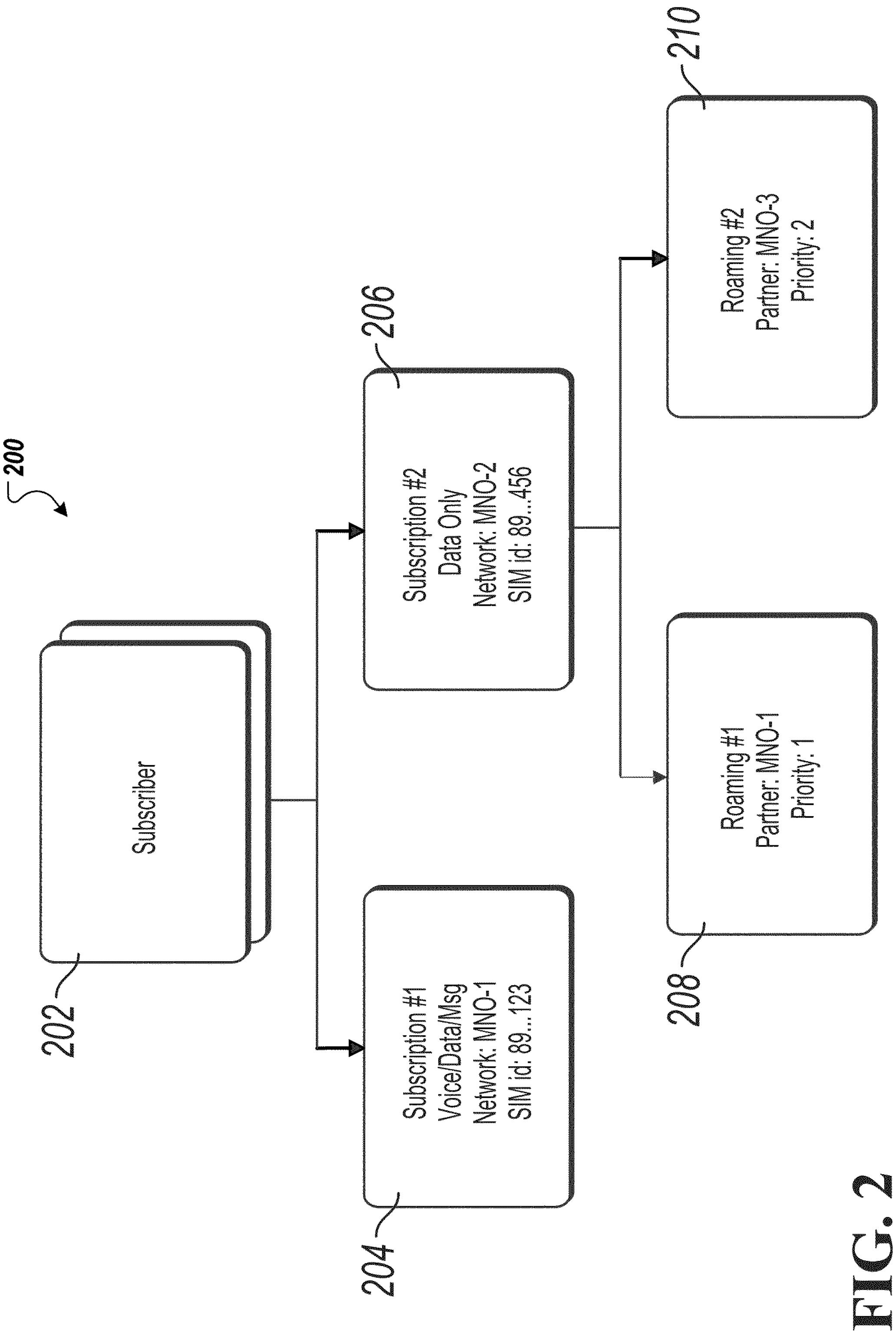
FIG. 2 is an example of a set of network services from at least one mobile network operator provisioned to a mobile device.

FIG. 2 shows an example of a set of network services 200 from at least one MNO provisioned to a mobile device in accordance with technology described herein. For example, the computing system can use the trained ML model to determine the subscriptions for the customer, e.g., subscriber 202. The subscriptions include a first subscription 204 with MNO-1 network service that includes voice, data, and message services. The first subscription is implemented on a first a subscriber identification module (SIM). The subscriptions include a second subscription 206 with MNO-2 5G network service that includes data. The second subscription is implemented on a second SIM. The first and second SIMs can be physical SIM cards or electronic SIMs (eSIMs). In addition, the computing system can determine that service in the second subscription 206, e.g., MNO-2 5G network service is associated with roaming services. The roaming services include a first roaming service 208 from MNO-1 and a second roaming service 210 from MNO-3. MNO-1 and MNO-3 are in collaboration with the MNO-2 network of the second subscription 206. The first roaming service 208 from the MNO-1 has a higher priority than the second roaming service 210 from MNO-3. In this example, the identified at least one MNO includes MNO-1, MNO-2, and MNO-3.

After identifying the at least one MNO 108 that can provide at least a portion of the requested wireless network services, the computing system of the intent engine 102 can generate a SIM profile request to retrieve the SIM profiles associated with the at least one MNO 108. The computing system of the intent engine 102 can transmit a SIM profile request to the at least one MNO system 108 to retrieve a corresponding SIM profile associated with each MNO 108. The computing system of the intent engine 102 can retrieve the SIM profiles through integration application programming interfaces (APIs) 116. The SIM profile associated with each MNO 108 includes the configurations and setting data for the portion of wireless network services provided by the MNO 108. For example, the computing system of the intent engine 102 can download SIM profiles from the at least one MNO system 108 onto the SIM 114 of the mobile device.

The SIM 114 can be a physical SIM card or an eSIM. In some implementations, the mobile device can have a universal SIM. In some implementations, the mobile device can have more than one SIM. For example, the mobile device can have two SIMs that function in accordance with dual SIM dual standby (DSDS) technology.

The computing system of the intent engine 102 provisions one or more SIMs of the mobile device in accordance with the corresponding SIM profile such that the portion of the wireless network services is provided on the mobile device by the corresponding MNO. For example, the computing system of the intent engine 102 can configure the SIMs including installing the SIM profile, setting up access point names (APNs), and configuring network settings.

The computing system of the intent engine 102 can include one or more computing devices, such as a server. The number of computing devices may be scaled (e.g., increased or decreased) automatically as per the computation resources needed. The various functional components of the computing system of the intent engine 102 may be installed on one or more computers as separate functional components or as different modules of a same functional component. For example, the various components of the computing system of the intent engine 102 can be implemented as computer programs installed on one or more computers in one or more locations that are coupled to each other through a network. In cloud-based systems for example, these components can be implemented by individual computing nodes of a distributed computing system.

The request device of the DOP platform 106 can include personal computer, mobile communication device, and other devices that can communicate with the computing system of the intent engine 102 over a network. The network can include a local area network ("LAN"), a wide area network ("WAN"), the Internet, or a combination thereof. Each MNO system 108 can include one or more computing devices, such as a server. Each MNO system 108 can have its own database that stores its data files, such as the SIM profiles.

Figure 3:
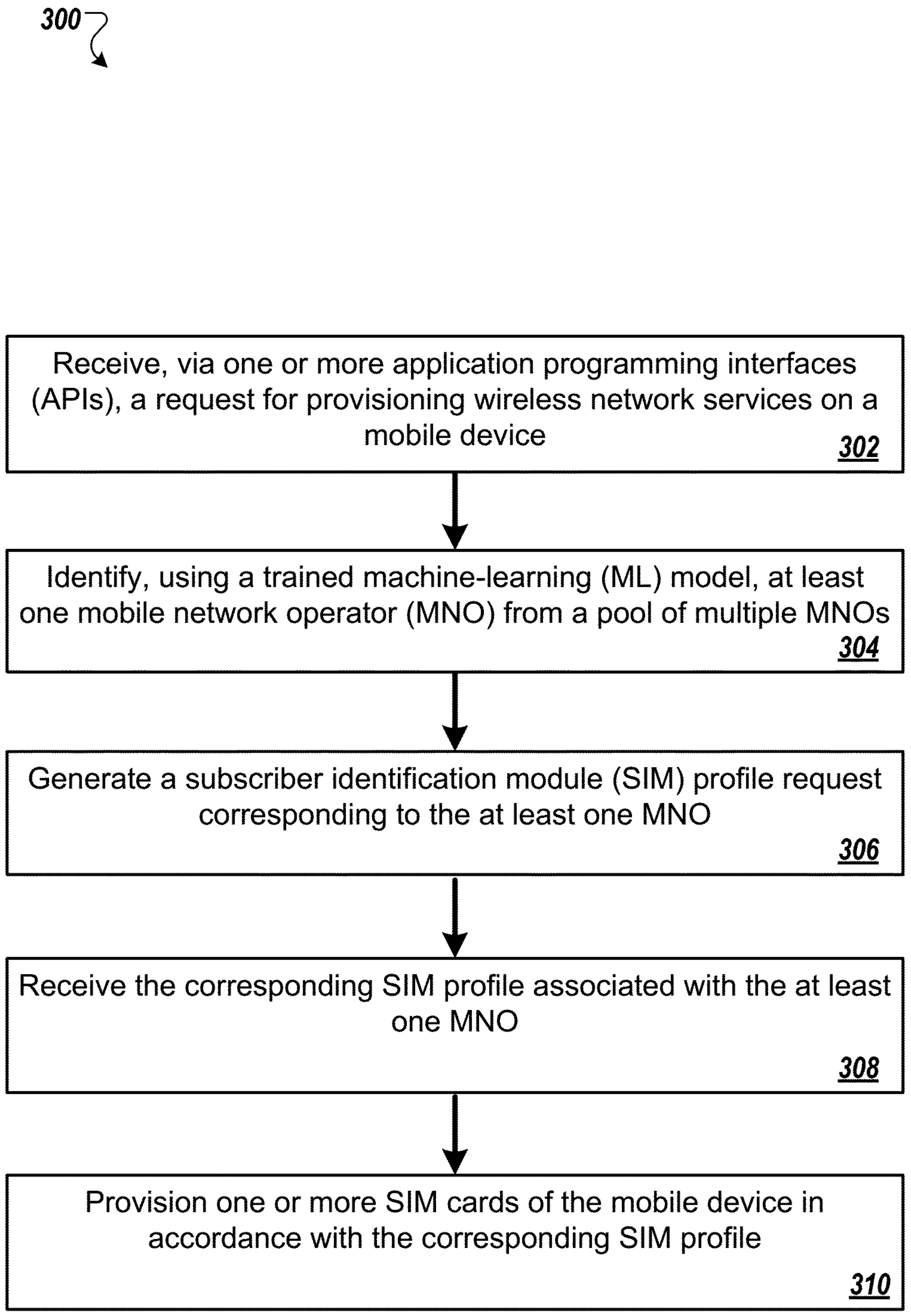
FIG. 3 is a flow diagram of an example process for intelligent network service provisioning.

FIG. 3 is a flow diagram of an example process for intelligent network service provisioning 300 in accordance with technology described herein. In some implementations, at least a portion of the process 300 can be executed at the computing system of the intent engine 102.

At step 302, the computing system can receive, via one or more application programming interfaces (APIs), a request for provisioning wireless network services on a mobile device. The request can identify target attributes associated with the wireless network services.

For example, the request can include the type of network service required, such as voice, data, or message services. In some implementations, one or more of the wireless network services can be associated with roaming services. The request can include the level of performance or quality required, such as bandwidth or delay of the networks available at the customer's location. The request can include the budget or cost constraints for the network services.

At step 304, the computing system can identify, using a trained machine-learning (ML) model, at least one mobile network operator (MNO) from a pool of multiple MNOs. The at least one MNO satisfies corresponding target attributes associated with at least a portion of the wireless network services. That is, the network services provided by the at least one MNO satisfy the target attributes of the requested network services. The computing system can examine the available services of the multiple network operators to select a set of wireless network services from the at least one MNO that satisfies the target attributes of the requested wireless network services in the request.

The computing system can provide granular provisioning capability to deploy specific network services from specific network operators. Each of the at least one MNO can provide at least a portion of the requested wireless network services. For example, the wireless network services provided by the at least one MNO can include (i) data services that are provided on the mobile device by a first MNO, and (ii) voice services that are provided on the mobile device by a second MNO different from the first MNO.

The network services can include network services across multiple network operators, including the network operator associated with the computing system, e.g., the home network operator, and other external network operators. The network services can include one or more network services from the home network operator, and one or more other network services from external network operators, e.g., partner network operators.

Each wireless network service provided by an MNO is associated with a roaming service from one or more partner MNOs that are in collaboration with the MNO. The one or more partner MNOs are each associated with a priority. The priorities of the partner MNOs can be determined by factors such as the nature of the service, the type of user, the cost of the service, and the home network operator's agreements with the partner MNOs.

The computing system can train the ML model to determine the at least one MNO and the corresponding portions of wireless network services based on the customer's location, coverage of various network services of the MNOs, the customer's preferences, a type of user device of the customer, predetermined service rules, and market preferences.

In some examples, the computing system can select at least one MNO and their corresponding network services based on the customer's location and the coverage of the various network services from multiple network operators. The computing system can select a specific network service component from a specific network operator that provides the coverage on the customer's location.

In some examples, the computing system can determine at least one MNO and their corresponding network services based on the customer's preferences. For instance, when there are multiple network services providing the coverage at the customer's location, the computing system can select an optimal network service based on the customer's preferences on the quality of service or the cost of service. In another example, the customer may prefer a prepaid plan over a postpaid plan. For prepaid devices, the computing system can determine network services that may have limitations compared to postpaid plans, such as slower data speeds, less coverage, and fewer features. In addition, some prepaid devices may be locked to a specific carrier or network, limiting the user's options for switching providers or using the device with other carriers. The network services for such prepaid devices may not include roaming services.

In some examples, the computing system can determine the at least one MNO and their corresponding network services based on the type of user device and its capability. The capability of a device for network service can depend on factors such as its processing power, memory, and storage capacity. High-end devices may be able to handle more complex applications and higher data rates, while lower-end devices may have more limited capabilities and require more efficient network protocols. The capability of a device can also include telecommunication capabilities, such as cellular connectivity, Wi-Fi® connectivity, Bluetooth connectivity, near field communication (NFC) capability, and the like. The computing system can select the appropriate network services for the customer based on the telecommunication capability of the customer's device to ensure its connectivity, performance, security, and reliability on the network.

In some examples, the computing system can determine at least one MNO and their corresponding network services based on predetermined service rules. For example, the predetermined service rules may include assigning more traffic to a particular network operator than another network operator. The predetermined service rules may include the percentage of traffic to each network operator. The predetermined service rules may be determined by an agreement between the home network operator and external network operators over an agreement. For example, a predetermined rule can be that 80% of the voice call services use the network service provided by MNO-1, and 20% of the voice call services use the network service provided by MNO-3.

In some examples, the computing system can determine at least one MNO and their corresponding network services based on market preferences. For example, if a particular zip code has a higher percentage of customers who prefer MNO-1 over other network operators, the computing system may consider offering MNO-1 network services to other customers in the same zip code area.

The computing system can use the ML model to determine the set of network services to satisfy a customer's specific needs and preferences. The customer's specific needs and preferences can be the customer's location, usage patterns, budget, and preferred network type (e.g., 5G, LTE, etc.). The ML model can predict the MNOs and the corresponding network services that will best satisfy the customer's needs and preferences. The ML model could be a decision tree, a neural network, or any other appropriate model.

In general, the ML model is iteratively trained, where, during an iteration, one or more parameters (e.g., weights) of the ML model are adjusted, and an output is generated based on the training data. For each iteration, a loss value is determined based on a loss function. The loss value represents a degree of accuracy of the output of the ML model. In some examples, if the loss value does not meet an expected value (e.g., is not equal to zero), parameters of the ML model are adjusted in another iteration of training. In some instances, this process is repeated until the loss value meets the expected value.

At step 306, the computing system generates a subscriber identification module (SIM) profile request corresponding to the at least one MNO. The SIM profile request is transmitted to retrieve a corresponding SIM profile associated with the at least one MNO.

The SIM profile associated with the MNO includes the configurations and settings data for the portion of wireless network services provided by the MNO. These configurations and settings include network-specific information, such as the APN (Access Point Name) for mobile data connectivity, network preferences, security settings, and other parameters required for the SIMs to connect to a specific mobile network. In other words, a SIM profile contains the essential information and settings needed for a SIM to function on a mobile network and connect to various services.

SIM profiles can be used in scenarios where multiple mobile networks are available, such as when using a mobile device while roaming or when switching between different carriers. By switching or updating the SIM profile, the mobile device can adapt to the network's requirements and establish the necessary connection.

After identifying the at least one MNO that can provide at least a portion of the requested wireless network services, the computing system can generate the SIM profile request to retrieve the SIM profiles associated with the at least one MNO.

At step 308, the computing system receives the corresponding SIM profile associated with the at least one MNO. The received SIM profile from each MNO can include the configurations and settings for the SIMs of the mobile device to connect to the portion of the requested wireless network service provided by the corresponding MNO.

For example, the computing system can download SIM profiles from the at least one MNO onto the SIMs of the mobile device. Each profile contains settings and configurations that are specific to the corresponding network operator/provider.

In some implementations, the SIM profiles can be managed and modified by the network operator or service provider. They can be remotely updated over-the-air (OTA) to provide the necessary network settings or to activate specific services on the SIMS.

At step 310, the computing system provisions one or more SIMs of the mobile device in accordance with the corresponding SIM profile such that the portion of the wireless network services is provided on the mobile device by the corresponding MNO. The one or more SIMs include physical SIM cards or eSIMs.

In some implementations, the computing system can perform network provisioning to integrate the network services from the at least one MNO. For example, the computing system can configure the SIMs including installing the SIM profile, setting up access point names (APNs), and configuring network settings.

APNs are network settings that allow the user device to connect to the Internet and use mobile data. The computing system can configure the APN settings for each of the multiple network operators, as these settings can vary from one network provider/operator to another.

Furthermore, the computing system can also configure network settings of the set of network services, such as the network mode (e.g., 5G, 4G, 3G, and 2G) and roaming settings. The computing system can configure the roaming service according to the partner MNO's priorities.

In some implementations, the one or more SIMs include two SIMs that function in accordance with dual SIM dual standby (DSDS) technology. The DSDS technology allows a user device to have two SIMs active simultaneously. This means that the user device can receive calls and messages on both SIMs, and the user can switch between the two SIMs for making calls and using data services. With DSDS, users can take advantage of the benefits of having two different phone numbers and plans, such as using one SIM for personal use and the other for work, or using one SIM for voice calls and the other for data.

In some implementations, the two SIMs are provisioned such that a first SIM of the two SIMs has a subscription to a first subset of wireless network services from a first MNO, and a second SIM of the two SIMs has a subscription to a second subset of wireless network services from a second MNO different from the first MNO. For example, as shown in FIG. 2, the first SIM has a subscription to voice, data, and message services from MNO-1. The second SIM has a subscription to data-only services from MNO-2.

After provisioning, the mobile device has a subscription to a set of wireless network services provided by the at least one MNO. In some implementations, the computing system can select an optimal network service for a real-time application initiated on the mobile device. In some implementations, the computing system can determine real-time usage and execute real-time charging for the mobile device.

When a real-time application is initiated on the mobile device, the computing system can select, from the set of the network services, a particular network service for the real-time application. The particular network service can be an optimal network service that best satisfies the requirements of the real-time application and user's needs and preferences.

The optimal network service can be selected from the set of network services that are configured for the user device. The selected optimal network service can be the service providing coverage at the user's location for the real-time application. When there are multiple services available in the set of network services, the computing system can select the service with the highest bandwidth or lowest latency, or a service with better coverage in the user's location, or a service with lower cost.

The computing system can identify the type of the real-time application. Different real-time applications have varying network requirements. For instance, a video call may require voice service; an online game application may require data service. In some examples, an online game application may require low latency and high bandwidth, while a text-based chat application may have less stringent requirements.

The computing system can choose the optimal network service based on the requirements of the real-time application for the user device. For example, the computing system can select the voice service provided by one network operator (e.g., MNO-1) for the voice call, and the data service provided by another network operator (e.g., MNO-2) for the online game application. In some examples, the computing system can select the data service from the same network operator but with different technologies for different real-time applications. For instance, the computing system can select 5G data service provided by MNO-2 for an online game application, and select 3G data service provided by MNO-2 for a text-based application.

In some implementations, the computing system can continuously monitor network performance of the selected network service. The network performance can vary over time, and real-time applications may be sensitive to changes in network conditions. The computing system can continuously monitor the network performance and adjust the selected network service if necessary to ensure the best possible user experience.

The computing system can execute real-time charging for the selected particular network service. In real-time charging, the computing system can process customer usage information in real time, and calculate the charges that apply to that usage, based on a variety of factors, such as the type of network service used, the amount of data consumed, the time of data usage, and the location of the user device. Real-time charging and rating systems allow the computing system to provide customers with accurate and up-to-date information about their usage and charges.

Real-time charging and rating systems can also be used to support value-added services, such as loyalty programs or promotional offers. For example, a mobile network operator may offer a promotion that provides free data usage for a limited period or offers discounts on certain services during off-peak hours. Real-time charging and rating systems can ensure that these promotions are accurately applied to customer accounts and charges are calculated correctly.

The order of steps in the process 300 described above is illustrative only, and the process 300 can be performed in different orders. In some implementations, the process 300 can include additional steps, fewer steps, or some of the steps can be divided into multiple steps.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively or in addition, the carrier may be an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program can be written in any form of programming language, including compiled or interpreted languages, or declarative or procedural languages; and it can be deployed on a system of one or more computers in any form, including as a stand-alone program, e.g., as an app, or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

Figure 4:
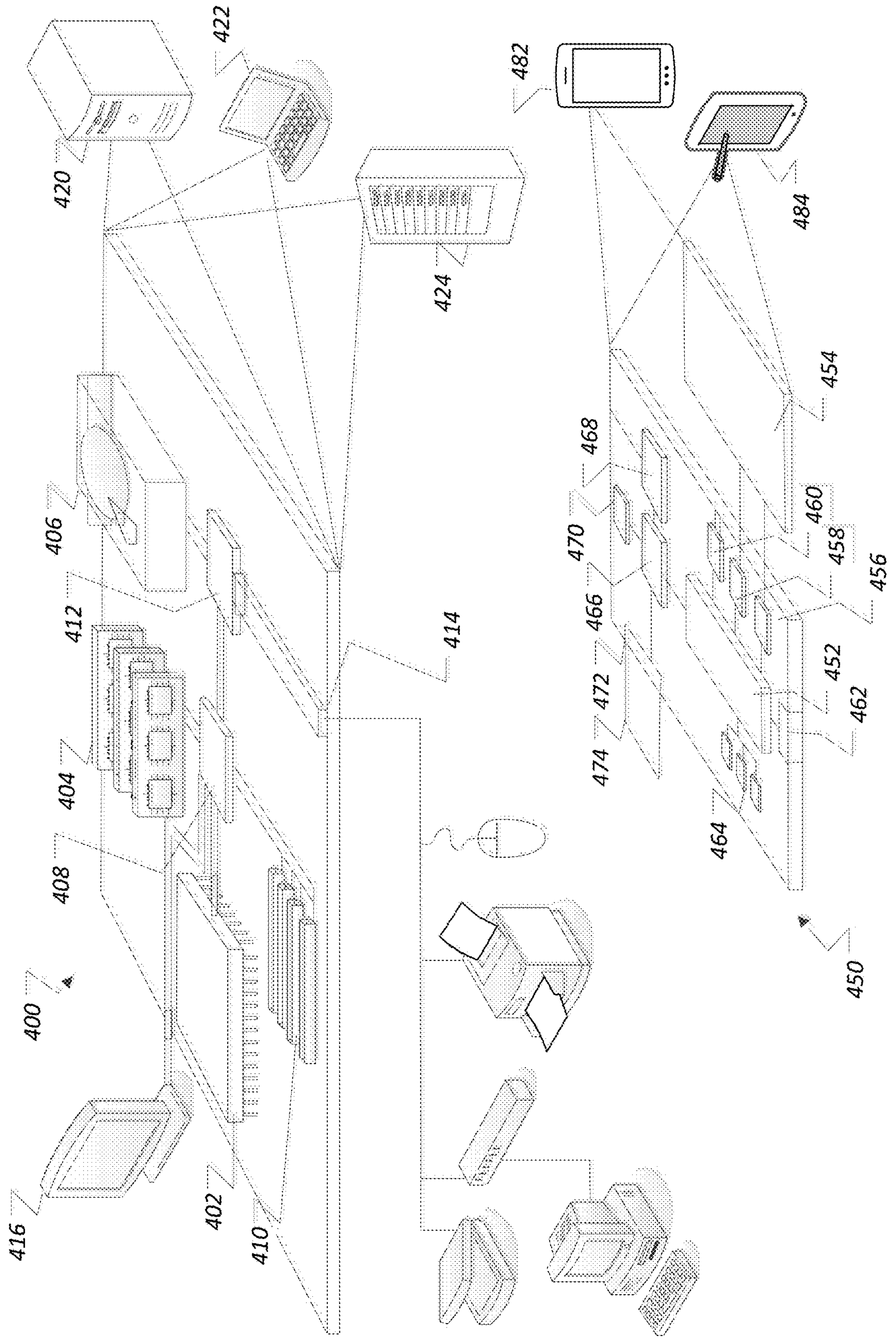
FIG. 4 illustrates block diagrams of example computing devices.

FIG. 4 shows an example of a computing device 400 and a mobile computing device 450 (also referred to herein as a wireless device) that are employed to execute implementations of the present disclosure. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smartphones, AR devices, and other similar computing devices. The components shown here, their connections and relationships, and their functions, are meant to be examples only, and are not meant to be limiting. The computing device 400 can form at least a portion of the computing system of the intent engine 102.

The computing device 400 includes a processor 402, a memory 404, a storage device 406, a high-speed interface 408, and a low-speed interface 412. In some implementations, the high-speed interface 408 connects to the memory 404 and multiple high-speed expansion ports 410. In some implementations, the low-speed interface 412 connects to a low-speed expansion port 414 and the storage device 406. Each of the processor 402, the memory 404, the storage device 406, the high-speed interface 408, the high-speed expansion ports 410, and the low-speed interface 412, are interconnected using various buses, and may be mounted on a common motherboard or in other manners as appropriate. The processor 402 can process instructions for execution within the computing device 400, including instructions stored in the memory 404 and/or on the storage device 406 to display graphical information for a graphical user interface (GUI) on an external input/output device, such as a display 416 coupled to the high-speed interface 408. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of a computer-readable medium, such as a magnetic or optical disk.

The storage device 406 is capable of providing mass storage for the computing device 400. In some implementations, the storage device 406 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 402, perform one or more methods, such as those described above. The instructions can also be stored by one or more storage devices, such as computer-readable or machine-readable mediums, such as the memory 404, the storage device 406, or memory on the processor 402.

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards. In the implementation, the low-speed interface 412 is coupled to the storage device 406 and the low-speed expansion port 414. The low-speed expansion port 414, which may include various communication ports (e.g., Universal Serial Bus (USB), Bluetooth, Ethernet, wireless Ethernet) may be coupled to one or more input/output devices. Such input/output devices may include a scanner, a printing device, or a keyboard or mouse. The input/output devices may also be coupled to the low-speed expansion port 414 through a network adapter. Such network input/output devices may include, for example, a switch or router.

The computing device 400 may be implemented in a number of different forms, as shown in FIG. 4. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device, such as a mobile computing device 450. Each of such devices may contain one or more of the computing device 400 and the mobile computing device 450, and an entire system may be made up of multiple computing devices communicating with each other.

The mobile computing device 450 includes a processor 452; a memory 464; an input/output device, such as a display 454; a communication interface 466; and a transceiver 468; among other components. The mobile computing device 450 may also be provided with a storage device, such as a micro-drive or other device, to provide additional storage. Each of the processor 452, the memory 464, the display 454, the communication interface 466, and the transceiver 468, is interconnected using various buses, and several of the components may be mounted on a common motherboard or in other manners as appropriate. In some implementations, the mobile computing device 450 may include a camera device(s) (not shown).

The processor 452 can execute instructions within the mobile computing device 450, including instructions stored in the memory 464. The processor 452 may be implemented as a chipset that includes separate and multiple analog and digital processors. For example, the processor 452 may be a Complex Instruction Set Computer (CISC) processor, a Reduced Instruction Set Computer (RISC) processor, or a Minimal Instruction Set Computer (MISC) processor. The processor 452 may provide, for example, for coordination of the other components of the mobile computing device 450, such as control of user interfaces (UIs), applications run by the mobile computing device 450, and/or wireless communication by the mobile computing device 450.

The processor 452 may communicate with a user through a control interface 458 and a display interface 456 coupled to the display 454. The display 454 may be, for example, a Thin-Film-Transistor Liquid Crystal Display (TFT) display, an Organic Light Emitting Diode (OLED) display, or other appropriate display technology. The display interface 456 may include appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a Single In-Line Memory Module (SIMM) card interface. The expansion memory 474 may provide extra storage space for the mobile computing device 450, or may also store applications or other information for the mobile computing device 450. Specifically, the expansion memory 474 may include instructions to carry out or supplement the processes described above, and may also include secure information. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 452, perform one or more methods, such as those described above. The instructions can also be stored by one or more storage devices, such as one or more computer-readable or machine-readable mediums, such as the memory 464, the expansion memory 474, or memory on the processor 452. In some implementations, the instructions can be received in a propagated signal, such as, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as Global System for Mobile Communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, and General Packet Radio Service (GPRS). Such communication may occur, for example, through the transceiver 468 using a radio frequency. In addition, short-range communication, such as using Bluetooth or Wi-Fi, may occur. In addition, a Global Positioning System (GPS) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in FIG. 4. Other implementations may include a phone device 482 and a tablet device 484. The mobile computing device 450 may also be implemented as a component of a smart-phone, personal digital assistant, AR device, or other similar mobile device.

Computing device 400 and/or 450 can also include USB flash drives. The USB flash drives may store operating systems and other applications. The USB flash drives can include input/output components, such as a wireless transmitter or USB connector that may be inserted into a USB port of another computing device. Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:

receiving, over a communications network and via one or more application programming interfaces (APIs) at one or more computing devices, a request for provisioning wireless network services on a mobile device, the request identifying target attributes associated with the wireless network services;

identifying, based on the received request for provisioning wireless network services on the mobile device and by the one or more computing devices using a trained machine-learning model, at least one mobile network operator (MNO) from a pool of multiple MNOs, the at least one MNO satisfying corresponding target attributes associated with at least a portion of the wireless network services;

generating, by the one or more computing devices, a subscriber identification module (SIM) profile request corresponding to the at least one MNO, wherein the SIM profile request is transmitted to retrieve a corresponding SIM profile associated with the at least one MNO;

receiving, at the one or more computing devices, the corresponding SIM profile associated with the at least one MNO; and provisioning, by the one or more computing devices, one or more SIMs of the mobile device in accordance with the corresponding SIM profile such that the portion of the wireless network services is provided on the mobile device by the at least one MNO.

2. The computer-implemented method of claim 1, wherein the one or more SIMs of the mobile device comprise two SIMs that function in accordance with dual SIM dual standby (DSDS) technology.

3. The computer-implemented method of claim 2, wherein the two SIMs of the mobile device are provisioned such that a first SIM of the two SIMs has a subscription to a first subset of wireless network services from a first MNO, and a second SIM of the two SIMs has a subscription to a second subset of wireless network services from a second MNO different from the first MNO.

4. The computer-implemented method of claim 1, wherein the one or more SIMs of the mobile device comprise a universal SIM.

5. The computer-implemented method of claim 1, wherein identifying the at least one MNO from the pool of multiple MNOs comprises:

identifying, based on the received request for provisioning wireless network services on the mobile device and by the one or more computing devices using the trained machine-learning model, both (i) a first MNO providing data services and (ii) a second MNO, different from the first MNO, providing voice services, wherein provisioning the one or more SIMs of the mobile device in accordance with the corresponding SIM profile comprises:

providing, on the mobile device, (i) the data services provided by the first MNO and (ii) the voice services provided by the second MNO different from the first MNO.

6. The computer-implemented method of claim 1, wherein each wireless network service provided by a MNO is associated with a roaming service from one or more partner MNOs that are in collaboration with the MNO, and wherein the one or more partner MNOs are each associated with a priority.

7. The computer-implemented method of claim 1, wherein the machine-learning model is trained to predict the at least one MNO and the corresponding portion of the wireless network services based on a customer's location, coverage of various network services of the MNOs, the customer's preferences, a type of the mobile device, predetermined service rules, and market preferences.

8. The computer-implemented method of claim 1, wherein identifying the at least one MNO from the pool of multiple MNOs comprises:

inputting data representing at least a portion of the request into the trained machine-learning model to predict the at least one MNO from the pool of multiple MNOs.

9. A non-transitory computer-readable medium encoded with instructions that, when executed by one or more computers, cause the one or more computers to perform operations comprising:

receiving, over a communications network and via one or more application programming interfaces (APIs), a request for provisioning wireless network services on a mobile device, the request identifying target attributes associated with the wireless network services;

identifying, based on the received request for provisioning wireless network services on the mobile device and using a trained machine-learning model, at least one mobile network operator (MNO) from a pool of multiple MNOs, the at least one MNO satisfying corresponding target attributes associated with at least a portion of the wireless network services;

generating a subscriber identification module (SIM) profile request corresponding to the at least one MNO, wherein the SIM profile request is transmitted to retrieve a corresponding SIM profile associated with the at least one MNO;

receiving the corresponding SIM profile associated with the at least one MNO; and provisioning one or more SIMs of the mobile device in accordance with the corresponding SIM profile such that the portion of the wireless network services is provided on the mobile device by the at least one MNO.

10. The non-transitory computer-readable medium of claim 9, wherein the one or more SIMs of the mobile device comprise two SIMs that function in accordance with dual SIM dual standby (DSDS) technology.

11. The non-transitory computer-readable medium of claim 10, wherein the two SIMs of the mobile device are provisioned such that a first SIM of the two SIMs has a subscription to a first subset of wireless network services from a first MNO, and a second SIM of the two SIMs has a subscription to a second subset of wireless network services from a second MNO different from the first MNO.

12. The non-transitory computer-readable medium of claim 9, wherein identifying the at least one MNO from the pool of multiple MNOs comprises:

identifying, based on the received request for provisioning wireless network services on the mobile device and using the trained machine-learning model, both (i) a first MNO providing data services and (ii) a second MNO, different from the first MNO, providing voice services, wherein provisioning the one or more SIMs of the mobile device in accordance with the corresponding SIM profile comprises:

providing, on the mobile device, (i) the data services provided by the first MNO and (ii) the voice services provided by the second MNO different from the first MNO.

13. The non-transitory computer-readable medium of claim 9, wherein each wireless network service provided by an MNO is associated with a roaming service from one or more partner MNOs that are in collaboration with the MNO, and wherein the one or more partner MNOs are each associated with a priority.

14. The non-transitory computer-readable medium of claim 9, wherein the machine-learning model is trained to predict the at least one MNO and the corresponding portion of the wireless network services based on a customer's location, coverage of various network services of the MNOs, the customer's preferences, a type of the mobile device, predetermined service rules, and market preferences.

15. A system comprising one or more computers and one or more storage devices on which are stored instructions that are operable, when executed by the one or more computers, to cause the one or more computers to perform operations comprising:

receiving, over a communications network and via one or more application programming interfaces (APIs), a request for provisioning wireless network services on a mobile device, the request identifying target attributes associated with the wireless network services;

identifying, based on the received request for provisioning wireless network services on the mobile device and using a trained machine-learning model, at least one mobile network operator (MNO) from a pool of multiple MNOs, the at least one MNO satisfying corresponding target attributes associated with at least a portion of the wireless network services;

generating a subscriber identification module (SIM) profile request corresponding to the at least one MNO, wherein the SIM profile request is transmitted to retrieve a corresponding SIM profile associated with the at least one MNO;

receiving the corresponding SIM profile associated with the at least one MNO; and provisioning one or more SIMs of the mobile device in accordance with the corresponding SIM profile such that the portion of the wireless network services is provided on the mobile device by the at least one MNO.

16. The system of claim 15, wherein the one or more SIMs of the mobile device comprise two SIMs that function in accordance with dual SIM dual standby (DSDS) technology.

17. The system of claim 16, wherein the two SIMs of the mobile device are provisioned such that a first SIM of the two SIMs has a subscription to a first subset of wireless network services from a first MNO, and a second SIM of the two SIMs has a subscription to a second subset of wireless network services from a second MNO different from the first MNO.

18. The system of claim 15, wherein identifying the at least one MNO from the pool of multiple MNOs comprises:

identifying, based on the received request for provisioning wireless network services on the mobile device and using the trained machine-learning model, both (i) a first MNO providing data services and (ii) a second MNO, different from the first MNO, providing voice services, wherein provisioning the one or more SIMs of the mobile device in accordance with the corresponding SIM profile comprises:

providing, on the mobile device, (i) the data services provided by the first MNO and (ii) the voice services provided by the second MNO different from the first MNO.

19. The system of claim 15, wherein each wireless network service provided by an MNO is associated with a roaming service from one or more partner MNOs that are in collaboration with the MNO, and wherein the one or more partner MNOs are each associated with a priority.

20. The system of claim 15, wherein the machine-learning model is trained to predict the at least one MNO and the corresponding portion of the wireless network services based on a customer's location, coverage of various network services of the MNOs, the customer's preferences, a type of the mobile device, predetermined service rules, and market preferences.

* * * * *